United States Patent
Shethia et al.

(10) Patent No.: US 12,545,268 B2
(45) Date of Patent: Feb. 10, 2026

(54) SYSTEMS AND METHODS FOR SAFE CONTROLLER SWITCHING DURING MODE TRANSITION FOR COMMERCIAL VEHICLES

(71) Applicant: ZF CV Systems Global GmbH, Bern (CH)

(72) Inventors: Shreyansh Shethia, West Lafayette, IN (US); Daniel Williams, Thorntown, IN (US)

(73) Assignee: ZF CV SYSTEMS GLOBAL GMBH, Bern (CH)

(*) Notice: Subject to any disclaimer, the term of this patent is extended or adjusted under 35 U.S.C. 154(b) by 187 days.

(21) Appl. No.: 18/475,256

(22) Filed: Sep. 27, 2023

(65) Prior Publication Data

US 2025/0100567 A1  Mar. 27, 2025

(51) Int. Cl.
*B60W 50/023* (2012.01)
*B60W 50/02* (2012.01)
*B60W 60/00* (2020.01)

(52) U.S. Cl.
CPC ...... *B60W 50/023* (2013.01); *B60W 50/0205* (2013.01); *B60W 60/00186* (2020.02); *B60W 2710/202* (2013.01)

(58) Field of Classification Search
CPC .......... B60W 50/023; B60W 50/0205; B60W 60/00186; B60W 2710/202
See application file for complete search history.

(56) References Cited

U.S. PATENT DOCUMENTS

| | | | |
|---|---|---|---|
| 12,221,111 B2* | 2/2025 | Hioki | G06V 20/56 |
| 2015/0353128 A1* | 12/2015 | Shibuya | B60W 10/02 |
| | | | 701/41 |
| 2016/0059886 A1* | 3/2016 | Tsunoda | B62D 5/0484 |
| | | | 701/43 |
| 2019/0106115 A1* | 4/2019 | Huang | B60W 10/18 |
| 2020/0136543 A1* | 4/2020 | Kawamura | H02P 21/22 |
| 2020/0290646 A1* | 9/2020 | Safour | B60W 50/14 |
| 2021/0024126 A1* | 1/2021 | Matsumura | B62D 5/12 |

(Continued)

FOREIGN PATENT DOCUMENTS

DE  102021214088 A1  6/2023

*Primary Examiner* — Sze-Hon Kong
(74) *Attorney, Agent, or Firm* — LEYDIG, VOIT & MAYER, LTD.

(57) ABSTRACT

A method for safe controller switching of a steering column of an autonomous vehicle is provided. The method comprises controlling the steering column using a first steering controller, wherein the first steering controller comprises a first fault detector, detecting a fault in the first steering controller using the first fault detector, communicating the detected fault of the first steering controller to the second steering controller, determining a transition time, within which control of the steering column is completely transferred from the first steering controller to a second steering controller. The method gradually transfers control of the steering column from the first steering controller to the second steering controller, wherein during the transition time control of the steering column is shared by the first steering controller and the second steering controller, and wherein after the transition time is expired, the steering controller is completely controlled by the second steering column.

20 Claims, 5 Drawing Sheets

(56) References Cited

U.S. PATENT DOCUMENTS

| | | | |
|---|---|---|---|
| 2021/0221434 A1* | 7/2021 | Liu | B60W 60/0015 |
| 2021/0316782 A1* | 10/2021 | Lee | B62D 1/181 |
| 2022/0135116 A1* | 5/2022 | Won | B62D 5/046 |
| | | | 701/42 |
| 2022/0332331 A1* | 10/2022 | Ming | B60R 16/033 |
| 2023/0045433 A1 | 2/2023 | Kim | |
| 2023/0100164 A1* | 3/2023 | Sun | B62D 5/0484 |
| | | | 701/41 |
| 2023/0131995 A1* | 4/2023 | Koudai | B62D 5/0481 |
| | | | 701/29.2 |
| 2023/0192139 A1* | 6/2023 | Kumavat | B60W 50/0098 |
| | | | 701/25 |
| 2023/0305155 A1* | 9/2023 | Horky | B60W 60/0015 |
| 2024/0083455 A1* | 3/2024 | Kume | B60K 35/10 |
| 2024/0154562 A1* | 5/2024 | Hattori | H02K 16/00 |
| 2024/0308573 A1* | 9/2024 | Jeong | B62D 5/049 |
| 2025/0002076 A1* | 1/2025 | Endo | B62D 5/0469 |
| 2025/0115296 A1* | 4/2025 | Kreis | B62D 15/0225 |

\* cited by examiner

SYSTEMS AND METHODS FOR SAFE CONTROLLER SWITCHING DURING MODE TRANSITION FOR COMMERCIAL VEHICLES

FIELD

The present disclosure relates to an automatic vehicle steering control system.

BACKGROUND

For autonomous driving in commercial vehicles, redundant steering ensures the steering system to have fail-safe performance. Redundant steering includes use of a primary controller and a secondary controller. During normal operations, the primary controller controls the steering column. Once failure in primary controller is detected, the control is switched to the secondary controller. However, simply switching between controllers can result into deterioration of performance and possibly hazardous situations.

US 2023/0045433 ("Kim") describes a steering control method for a redundant steering system. While Kim discusses a first steering controller and a second steering controller controlling the steering system, Kim does not discuss detecting a failure in a controller, let alone a safe transition of control of the steering system in response to detecting the failure.

DE102021214088 A1 ("Iwanski") describes a steering system with a master steering control unit and a slave steering control unit. The master and slave steering control units are connected to a higher level control unit via separate communication links and there is no communication between the master and the slave control units of the steering system of Iwanski as both master and slave are only connected to the higher-level control unit.

SUMMARY

Conventional methods of switching between a primary steering controller and a secondary steering controller of an autonomous commercial vehicle lead to deterioration of performance of the autonomous commercial vehicle. The deterioration in performance may also lead to hazardous situations in operation of the autonomous commercial vehicle.

Embodiments of the present disclosure provide, in a first aspect, a method for safe controller switching of a steering column of an autonomous vehicle, the method comprising: controlling the steering column using a first steering controller, wherein the first steering controller comprises a first fault detector; detecting a fault in the first steering controller using the first fault detector; communicating the detected fault of the first steering controller to the second steering controller; determining a transition time, within which control of the steering column is completely transferred from the first steering controller to a second steering controller; and gradually transferring control of the steering column from the first steering controller to the second steering controller, wherein during the transition time control of the steering column is shared by the first steering controller and the second steering controller, and wherein after the transition time is expired, the steering controller is completely controlled by the second steering column.

According to an implementation of the first aspect, the method further comprises conveying to an autonomous controller of the autonomous vehicle that the second steering controller is in control of the steering column, wherein the autonomous controller brings the autonomous vehicle to a stop based on the conveying.

According to an implementation of the first aspect, detecting the fault in the first steering controller comprises: receiving, at the first steering controller from the autonomous controller, an expected value of torque to be applied on the steering column by the first steering controller; determining, by a plurality of sensors, an actual value of torque applied on the steering column by the first steering controller; and detecting, by the first fault detector, the fault in the first steering controller based on comparing the expected value to the actual value.

According to an implementation of the first aspect, communicating the detected fault of the first steering controller to the second steering controller comprises: sending a message from the first steering controller to the second steering controller, wherein the message indicates the detected fault of the first steering controller; and receiving, at the first steering controller, a reply message from the second steering controller that confirms the detected fault of the first steering controller.

According to an implementation of the first aspect, receiving a message from the second steering controller that confirms the detected fault of the first steering controller comprises: receiving, at the second steering controller from an autonomous controller of the autonomous vehicle, an expected value of torque to be applied on the steering column; determining, by a second fault detector of the second steering controller, the actual value of torque applied on the steering column by the first steering controller; detecting, by the second fault detector, the fault in the first steering controller based on comparing the expected value to the actual value; receiving a message from the first steering column that indicates the fault in the first steering column; and sending the reply message to the first steering controller based on the detecting.

According to an implementation of the first aspect, the transition time is computed using the first fault detector or the second fault detector.

According to an implementation of the first aspect, based on determining that the actual value is greater than the expected value, the detected fault is classified as excessive torque.

According to an implementation of the first aspect, based on determining that the actual value is lesser than the expected value, the detected fault is classified as insufficient torque.

According to an implementation of the first aspect, based on determining that the actual value is different from the expected value over a period of time, the detected fault is classified as erratic torque.

According to an implementation of the first aspect, a lane departure of the autonomous vehicle occurs when the transition period expires.

A second aspect of the present disclosure provides a steering system of an autonomous vehicle, the steering system comprising: a steering column; a first steering controller configured to control the steering column, the first steering controller comprising a first fault detector configured to monitor and detect a fault in the steering system; a second steering controller configured to control the steering column, the second steering controller comprising a second fault detector configured to monitor the steering system and to detect a fault in the steering system, wherein the first and second fault detectors communicate with each other; and wherein the first fault detector is configured to send a fault detection signal to the second fault detector based on detecting a fault in the first steering controller, and wherein, based on receiving a fault detection signal from the first fault detector, the second steering controller is configured to partially control the steering column along with the first steering controller during a transition time, and completely control the steering column after the transition time.

BRIEF DESCRIPTION OF THE DRAWINGS

Embodiments of the present disclosure will be described in even greater detail below based on the exemplary figures. The present disclosure is not limited to the exemplary embodiments. All features described and/or illustrated herein can be used alone or combined in different combinations in embodiments of the present disclosure. The features and advantages of various embodiments of the present disclosure will become apparent by reading the following detailed description with reference to the attached drawings which illustrate the following.

DETAILED DESCRIPTION

Examples of the presented application will now be described more fully hereinafter with reference to the accompanying FIGS., in which some, but not all, examples of the application are shown. Indeed, the application may be exemplified in different forms and should not be construed as limited to the examples set forth herein; rather, these examples are provided so that the application will satisfy applicable legal requirements. Where possible, any terms expressed in the singular form herein are meant to also include the plural form and vice versa, unless explicitly stated otherwise. Also, as used herein, the term "a" and/or "an" shall mean "one or more" even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on".

Autonomous commercial vehicles have redundant steering controllers to ensure a fail-safe operation of the autonomous commercial vehicles. In some embodiments, there is a primary steering controller and a secondary steering controller that are both capable of controlling a steering column of the autonomous commercial vehicle. In case a failure in the primary steering controller is detected by a fault detector of the primary steering controller, the control of the steering column is switched control from the primary steering controller to the secondary steering controller. However, conventional methods of transferring control may be abrupt and may lead to hazardous conditions, for example, the primary steering controller may abruptly lose control of the steering column causing the car to depart from its lane. In some cases, the loss of control of the steering control column may cause a car travelling at 60 miles per hour to depart from its lane in approximately 600 milliseconds.

One way to avoid hazardous situations and deterioration of performance of autonomous commercial vehicles includes a gradual transfer of control between the primary steering controller and the secondary steering control when a fault is detected in the primary steering controller. During the gradual transfer of control of the steering column from the primary steering controller to the secondary steering controller, both the primary steering controller and the secondary steering controller provide partial control to the steering column. The control of the primary controller on the steering column is gradually reduced and the control of the secondary steering controller on the steering column is gradually increased.

Figure 1:
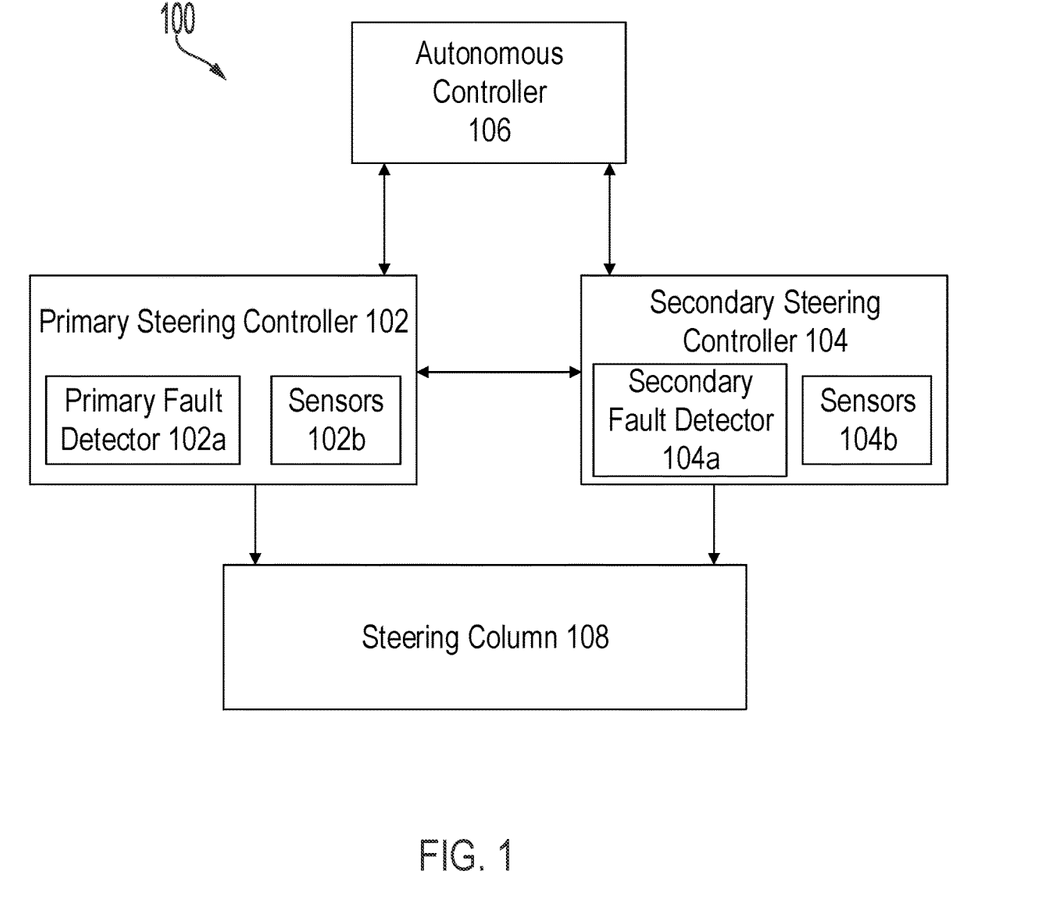
FIG. 1 illustrates a simplified block diagram depicting an environment for safely switching steering control in an autonomous vehicle, according to one or more examples of the present disclosure.

FIG. 1 illustrates a simplified block diagram depicting an environment for safely switching steering control in an autonomous commercial vehicle, according to one or more examples of the present disclosure. System 100 of an autonomous control vehicle depicted in FIG. 1 includes an autonomous controller 106, a primary steering controller 102, a secondary steering controller 104, and a steering column 108. The steering column 108 is part of the autonomous commercial vehicle and performs the actual steering operation of the autonomous control vehicle. The steering column 108 may be controlled by the primary steering controller 102 or the secondary steering controller 104, or both. In some embodiments, the primary steering controller 102 is the default controller of the steering column 108, and the secondary steering controller 104 is a backup controller of the steering column 108.

The primary steering controller 102 has a primary fault detector 102a and sensors 102b. The secondary steering controller 104 has a secondary fault detector 104a and sensors 104b. The primary fault detector 102a and the secondary fault detector 104a are configured to detect operational faults in primary steering controller 102 and the secondary steering controller 104 respectively. In some embodiments, the secondary fault detector 104a is also configured to detect faults in the primary steering controller 102. For example, the primary fault detector 102a and the secondary fault detector 104a are configured to determine a motor torque fault of the steering column 108. A motor torque fault of the steering column may be determined by determining a variation between an applied torque on the steering column 108 and an expected torque on the steering column 108. The autonomous controller 106 of the autonomous commercial vehicle may instruct the primary steering controller 102 to apply a torque of a certain magnitude on the steering column 108. This value of torque received from the autonomous controller 106 may be known as an expected value of torque to be applied on the steering column 108. In response to receiving the value of torque from the autonomous controller 106, the primary steering controller 102 applies a value of torque on the steering column 108. The applied value of torque on the steering column 108 is measured by the sensors 102b.

Sensors 102b may include a motor position sensor and torque and angle sensor. The motor position sensor and torque and angle sensor measure the motor torque and steering column torque respectively. The measured values of torque applied on the steering column 108 are conveyed to the primary fault detector 102a. The primary fault detector 102a may compare the expected value of torque on the steering column 108 that is received from the autonomous controller 106 with the actual value of torque applied on the steering column 108 that is measured by sensors 102b. In case the primary fault detector 102a detects a difference in the expected value of torque and the actual value of torque on the steering column 108, the primary fault detector 102a detects a fault in the primary steering controller 102.

In some embodiments, the autonomous controller 106 also provides the expected torque value that is to be applied to the steering column 108 to the secondary steering controller 104, while the secondary steering controller 104 is not in control of the steering column 108. The sensors 104b that are part of the secondary steering controller 104, and include a motor position sensor and a torque and angle sensor as sensors 102b, also measure values of torque applied on the steering column 108 are conveyed to the primary fault detector 102a. Like the primary fault detector 102a, the secondary fault detector 104a also compares the expected value of torque on the steering column 108 that is received from the autonomous controller 106 with the actual value of torque applied on the steering column 108 that is measured by sensors 104b. In case the secondary fault detector 104a detects a difference in the expected value of torque and the actual value of torque on the steering column 108, the secondary fault detector 104a detects a fault in the primary steering controller 102 independently from the primary fault detector 102a. The secondary sensors 104b provide a redundancy in measuring torque of the steering column 108 to supplement the measurements provided by the primary sensors 102b.

The fault in the primary steering controller 102 may be a motor torque fault. The motor torque fault may be caused due to excessive motor torque (e.g., the applied torque is greater than the expected torque), insufficient motor torque (e.g., the applied torque is less than the expected torque), and erratic torque (e.g., the applied torque is not consistent with the expected torque over a predetermined period of time).

Once a difference detected between the expected torque and the applied torque detected by the primary fault detector 102a and/or the secondary fault detector 104a, the primary fault detector 102a conveys the detected fault to the secondary steering controller 104. In some embodiments, the secondary controller 104 independently detects a fault in the primary controller 102 as described above. In such embodiments, the secondary controller sends a confirmatory message to the primary controller 102, in response to receiving the message indicating the fault from the primary controller 102.

After informing the secondary controller 104 of the detected fault in the primary controller 102, the primary fault detector 102a computes a time taken for the detected fault in the primary steering controller 102a to affect the operation of the autonomous commercial vehicle. For example, the detected fault in the steering column 108 may cause the autonomous commercial vehicle to unsafely depart from its lane during driving. This time taken for the detected fault of the primary steering controller 102 to cause a lane departure of the autonomous commercial vehicle is a factor of the speed at which the autonomous commercial vehicle is operating. At higher speeds (greater than 65 miles per hour) the time to lane departure is lower (e.g., 300-400 milliseconds), and at lower speeds, the time to lane departure is higher (400-700 milliseconds). In order for a smooth operation of the autonomous commercial vehicle, the control of the steering column 108 may transition from the first steering controller 102 to the secondary steering controller 104 before the fault in the first steering controller 102 causes a lane departure of the autonomous commercial vehicle.

Therefore, the time it takes for the detected fault in the primary steering controller 102 to cause a lane departure of the autonomous commercial vehicle is also known as transition time.

The transfer of control of the steering column from the primary steering controller 102 to the secondary steering controller 104 is gradual to ensure no deterioration in performance of the autonomous commercial vehicle. Before the fault in the primary steering controller 102 is detected, the primary steering controller is in complete control of the steering column 108. Once the fault in the primary steering controller 102 is detected, the transition period commences, and the gradual transfer of control from the primary steering controller 102 to the secondary steering controller 104 is initiated. During the transition, the gradual transfer of control of the steering column 108 from the primary steering controller 102 to the secondary steering controller 104 is in progress, and both the primary steering controller 102 and the secondary steering controller 104 provide partial control to the steering column 108. The control of the primary steering controller 102 on the steering column 108 is gradually reduced and the control of the secondary steering controller 104 on the steering column 108 is gradually increased. Once the transition period is over, the secondary steering controller 104 is in complete control of the steering column 108.

Once the transfer of control is complete, the primary steering controller 102 and/or the secondary steering controller 104 inform the autonomous controller 106 that the control of the steering column 108 has been shifted from the primary steering controller 102 to the secondary steering controller 104. In some embodiments, the autonomous controller 106, upon receiving the message that the control of the steering column 108 is with the secondary steering controller 104, may safely bring the autonomous vehicle to a halt for further investigation of the fault in the primary steering controller 102.

In some embodiments, the primary fault detector 102a, the secondary fault detector 104a and the autonomous controller 106 may be connected to each other using wired (e.g., CAN bus) or wireless connections.

In some embodiments, when the primary steering controller 102 is configured to control the steering column 108, the primary fault detector 102a of the primary steering controller 102 may anticipate an upcoming operational fault in the primary steering controller 102. This upcoming fault may be anticipated by detecting a difference in the expected torque and applied torque of steering column 108. Upon anticipating a fault in the primary steering controller 102, the primary fault detector 102a may raise a flag, notifying the secondary steering controller 104a of a potential fault in the primary steering controller. Upon detecting the difference in the applied torque and the expected torque, the primary fault detector 102a may also compute a transition time for the autonomous vehicle to depart from its lane. Upon determining that an operational fault is upcoming in the primary steering controller 102, and the transition time, the primary fault detector 102a may communicate the determined information to the autonomous controller 106 and the secondary steering controller 104. Simultaneously, the primary fault detector 102a may continue to confirm whether the anticipated fault of the primary steering controller 102 will actually occur at the determined time.

Figure 2A:
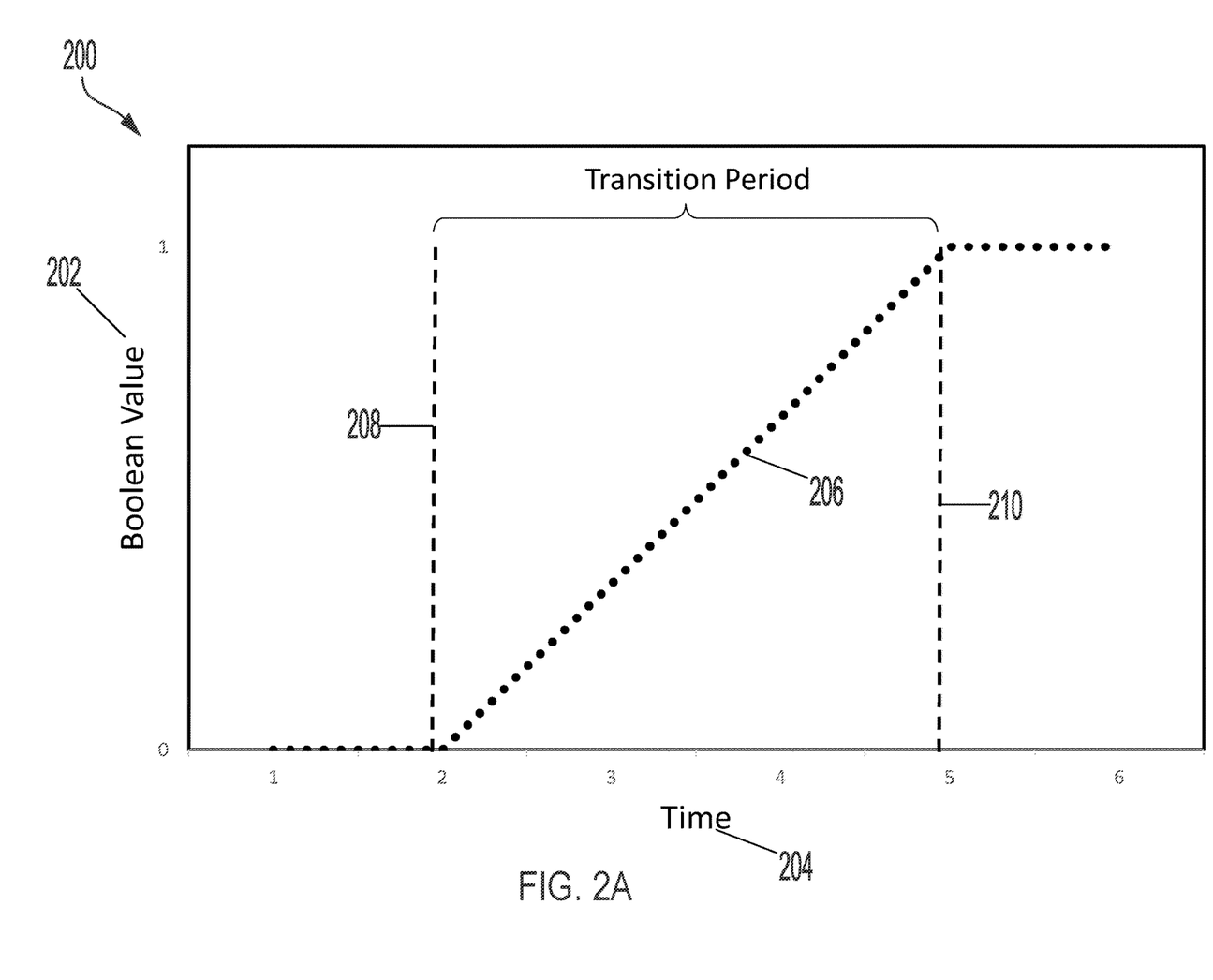
FIGS. 2A and 2B illustrates graphs that show safe switching of steering control in an autonomous vehicle, according to one or more examples of the present disclosure.
Figure 2B:
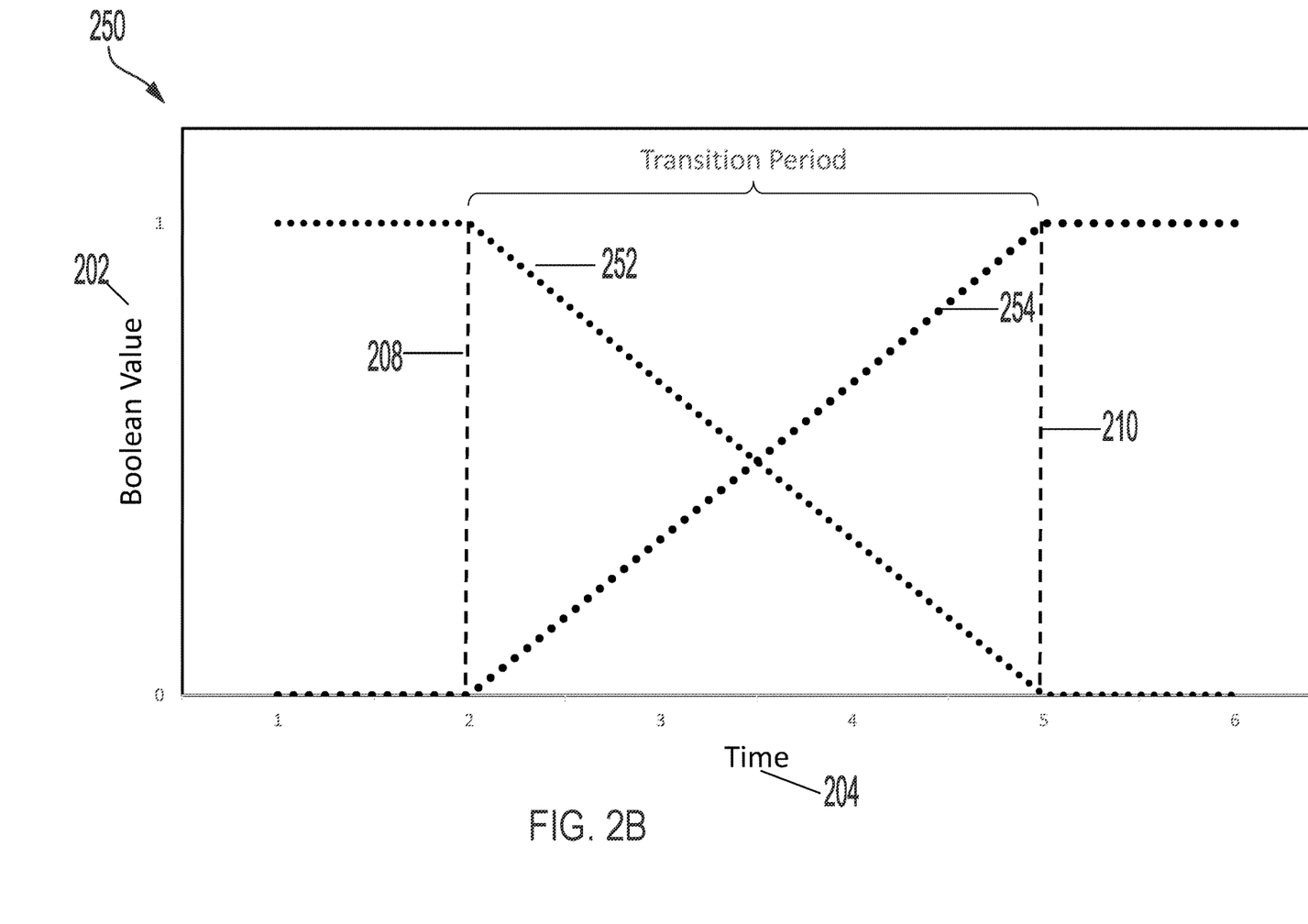

FIGS. 2A and 2B illustrates graphs that show safe switching of steering control in an autonomous vehicle, according to one or more examples of the present disclosure. In particular, FIG. 2A depicts a graph 200 of an upcoming fault in the primary steering controller 102 as described in FIG. 1, according to one or more examples of the present disclosure. The graph 200 of FIG. 2A plots a Boolean value of the departure of the autonomous commercial vehicle from its lane on the y-axis 202 and the time elapsed on the x-axis 204. Before time 208, the curve 206 of graph 200 is flat at 0, indicating that no fault is detected by the primary fault controller 102. At time 208, the primary fault detector 102*a* detects a fault in the primary steering controller 102. The primary fault detector 102*a* also estimates the transition time in which the fault in the primary steering controller 102 will cause a lane departure of the autonomous commercial vehicle. In graph 200, the time at which the detected fault may cause the lane departure of the autonomous commercial vehicle is indicated by time 210. After time 210, the curve 206 is flat at 1, indicating that the fault has caused the lane departure of the autonomous commercial vehicle. The window of time between time 208 and time 210 is known as the transition period. In some embodiments, the primary fault detector 102*a* may communicate the time 208, the transition period, and the detected fault to the secondary steering controller 104. In some embodiments, the transition period is determined by the primary fault detector 102*a* based on the current speed of the autonomous commercial vehicle. In some embodiments, the transition period may be determined by the second fault detector 104*a*, based on a speed of the autonomous commercial vehicle as provided by the autonomous controller 106. At time 210 and onwards, the detected fault may cause the lane departure of the autonomous commercial vehicle. Therefore, in order to avoid hazardous situations in the operation of the autonomous commercial vehicle, a switch from the primary steering controller 102 to the secondary controller 104 is initiated to take control of the steering column 108 before the transition period is over. This is shown in more detail in FIG. 2B.

FIG. 2B depicts a graph 250 that depicts the transfer of control of the steering column 108 from the primary steering controller 102 to the secondary steering controller 104, according to one or more examples of the present disclosure. Similar to graph 200, graph 250 also plots a Boolean value on the y-axis 202 and time on the x-axis 204. The Boolean value of graph 250 plots control of the steering column 108. Curve 252 of graph 250 depicts behavior of the primary steering controller 102 and curve 254 of graph 250 depicts behavior of the secondary steering controller 104. Before time 208, the curve 252 of graph 250 is flat at 1, indicating that the primary steering controller 102 is in control of the steering column 108, and the curve 254 of graph 250 is flat at 0, indicating that the secondary steering controller 104 is not controlling the steering column 108.

At time 208, the primary fault detector 102*a* detects a fault in the primary steering controller 102 and the time it will take for the detected fault to cause a lane departure in the autonomous commercial vehicle, also known as transition time. The detected fault and the transition time are communicated by the primary fault detector 102*a* to the secondary steering controller 104. Time 210 indicates the time at which the lane departure of the autonomous commercial vehicle will take place, if corrective action is not taken. Within the transition time, the curve 252 corresponding to the primary steering controller goes from 1 to 0, implying that the control of the primary steering controller 102 on the steering column 108 is gradually reducing until time 210. At the same time, in the transition period, the curve 254 corresponding to the secondary steering controller 104 goes from 0 to 1, implying that control of the secondary steering controller 104 on the steering column 108 is gradually increasing until time 210. After time 210, the curve 252 of graph 250 is flat at 0, indicating that the primary steering controller 102 is not controlling steering column 108, and the curve 254 of graph 250 is flat at 1, indicating that the secondary steering controller 104 is in complete control of the steering column 108. In some embodiments, the transfer of control of the steering column from the primary controller 102 to the secondary controller 104 requires a transfer of torque applied on the steering column 108 from the primary steering controller 102 to the secondary steering controller 104. During the transfer of control from the primary steering controller 102 to the secondary steering controller 104, the torque that is applied to the steering column 108 from the primary steering controller 102 is gradually decreased and the torque that is applied to the steering column 108 from the secondary steering controller 104 is gradually increased, as is shown by the decreasing curve 252 and the increasing curve 254. During this gradual transition, both the primary steering controller 102 and the secondary steering controller 104 are providing part of the torque to control the steering column 108. When the transition time ends, the secondary steering controller 104 is the only controller applying the torque to the steering column 108. Because the secondary steering controller 104 takes control of the steering column 108 before the lane departure of the autonomous commercial vehicle, the autonomous controller 106 is able to avoid a hazardous situation for the autonomous commercial vehicle.

Figure 3:
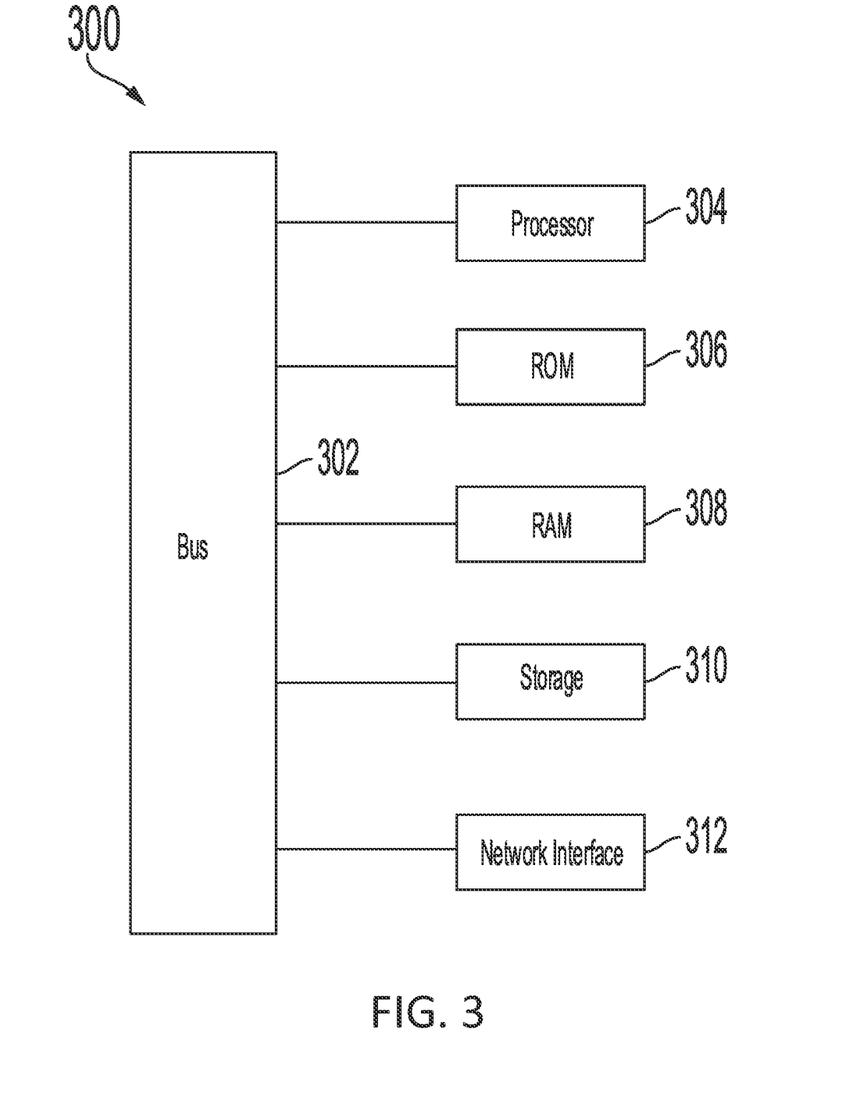
FIG. 3 is a block diagram of an exemplary controller associated with an autonomous vehicle, according to one or more examples of the present disclosure.

FIG. 3 is a block diagram of an exemplary system or device 300 within the system 100 such as the controller 104. The system 300 includes a processor 304, such as a central processing unit (CPU), and/or logic, that executes computer executable instructions for performing the functions, processes, and/or methods described herein. In some examples, the computer executable instructions are locally stored and accessed from a non-transitory computer readable medium, such as storage 310, which may be a hard drive or flash drive. Read Only Memory (ROM) 306 includes computer executable instructions for initializing the processor 304, while the random-access memory (RAM) 308 is the main memory for loading and processing instructions executed by the processor 304. The network interface 312 may connect to a wired network or cellular network and to a local area network or wide area network. The system 300 may also include a bus 302 that connects the processor 304, ROM 306, RAM 308, storage 310, and/or the network interface 312. The components within the system 300 may use the bus 302 to communicate with each other. The components within the system 300 are merely exemplary and might not be inclusive of every component within the controller 104. Additionally, and/or alternatively, the system 300 may further include components that might not be included within every entity of system 100. For instance, in some examples, the controller 104 might not include a network interface 312.

Figure 4:
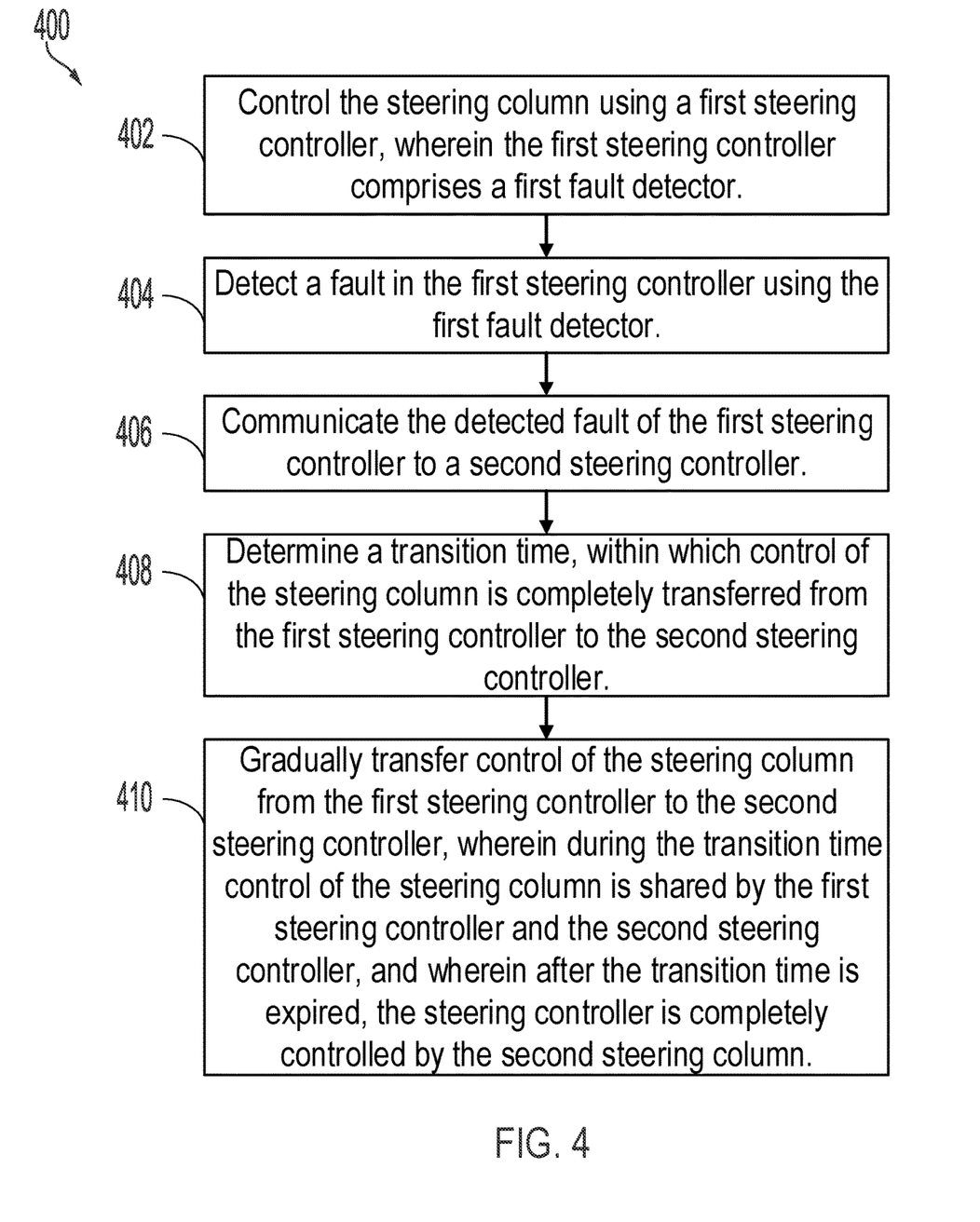
FIG. 4 illustrates an exemplary process for performing a safe switching of steering control in an autonomous vehicle, according to one or more examples of the present disclosure.

FIG. 4 illustrates an exemplary process for performing a safe switching of steering control in an autonomous vehicle, according to one or more examples of the present disclosure. The process 400 may be performed by any of the blocks of FIG. 1, in any suitable order and that the process 400 may be performed in any environment and by any suitable computing device and/or controller. For instance, the process 400 may also be performed by the primary steering controller 102 and/or the secondary steering controller 104 of FIG. 1.

At block 402, the steering column is controlled by a first steering controller, wherein the first steering controller comprises a first fault detector. For example, the steering column 108 of the autonomous vehicle, as shown in FIG. 1, may be controlled by a primary steering controller 102 that includes a primary fault detector 102*a*.

At block 404, a fault in the first steering controller is detected using the fist fault detector. For example, the primary fault detector 102*a* of the primary steering controller 102 may detect a fault in the primary steering controller 102. The fault in the primary steering controller 102 may be detected by comparing an expected torque on the steering column 108 with an actual torque applied on the steering column 108 by the primary steering controller 102. The expected torque may be received from the autonomous controller 106 and the actual torque on the steering column 108 may be measured using sensors 102*b* that include a motor position sensor and a torque and angle sensor.

At block 406, the detected fault of the first steering controller is communicated to a second steering controller. For example, the primary steering controller 102 and the secondary steering controller 104 are connected via a private CAN bus and the detected fault is communicated from the primary steering controller 102 to the secondary steering controller 104.

At block 408, a transition time is determined, within which control of the steering column is completely transferred from the first steering controller to the second steering controller. The transition time is a time after which, the detected fault in the primary steering controller 102 causes a lane departure of the autonomous commercial vehicle. In some embodiments, the transition time may be determined using the first fault detector 102*a* or the second fault detector 104*a*, or both.

At block 410, control of the steering column is gradually transferred from the first steering controller to the second steering controller, wherein during the transition time control of the steering column is shared by the first steering controller and the second steering controller, and wherein after the transition time is expired, the steering controller is completely controlled by the second steering column. When the gradual transfer of control of the steering column 108 from the primary steering controller 102 to the secondary steering controller 104 is in progress, both the primary steering controller 102 and the secondary steering controller 104 provide partial control to the steering column 108. The control of the primary steering controller 102 on the steering column 108 is gradually reduced and the control of the secondary steering controller 104 on the steering column 108 is gradually increased. Once the transition period is over, the secondary steering controller 104 is in complete control of the steering column 108 ad the primary steering controller 102 is not at all in control of the steering column 108.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A method for safe controller switching of a steering column of an autonomous vehicle, the method comprising:
    controlling the steering column using a first steering controller, wherein the first steering controller comprises a first fault detector;
    detecting a fault in the first steering controller using the first fault detector;
    communicating the detected fault of the first steering controller to a second steering controller;
    determining a transition time, within which control of the steering column is completely transferred from the first steering controller to the second steering controller; and
    gradually transferring control of the steering column from the first steering controller to the second steering controller,
    wherein during the transition time control of the steering column is shared by the first steering controller and the second steering controller, and
    wherein after the transition time is expired, the steering column is completely controlled by the second steering controller.

2. The method of claim 1, further comprising:
    conveying to an autonomous controller of the autonomous vehicle that the second steering controller is in control of the steering column, wherein the autonomous controller brings the autonomous vehicle to a stop based on the conveying.

3. The method of claim 2, wherein detecting the fault in the first steering controller comprises:
    receiving, at the first steering controller from the autonomous controller, an expected value of torque to be applied on the steering column by the first steering controller;
    determining, by a plurality of sensors, an actual value of torque applied on the steering column by the first steering controller; and
    detecting, by the first fault detector, the fault in the first steering controller based on comparing the expected value to the actual value.

4. The method of claim 3, wherein:
    based on determining that the actual value is greater than the expected value, the detected fault is classified as excessive torque.

5. The method of claim 3, wherein:
    based on determining that the actual value is lesser than the expected value, the detected fault is classified as insufficient torque.

6. The method of claim 3, wherein:
    based on determining that the actual value is different from the expected value over a period of time, the detected fault is classified as erratic torque.

7. The method of claim 1, wherein communicating the detected fault of the first steering controller to the second steering controller comprises:
- sending a message from the first steering controller to the second steering controller, wherein the message indicates the detected fault of the first steering controller; and
- receiving, at the first steering controller, a reply message from the second steering controller that confirms the detected fault of the first steering controller.

8. The method of claim 7, receiving a message from the second steering controller that confirms the detected fault of the first steering controller comprises:
- receiving, at the second steering controller from an autonomous controller of the autonomous vehicle, an expected value of torque to be applied on the steering column;
- determining, by a second fault detector of the second steering controller, the actual value of torque applied on the steering column by the first steering controller;
- detecting, by the second fault detector, the fault in the first steering controller based on comparing the expected value to the actual value;
- receiving a message from the first steering controller that indicates the fault in the first steering controller; and
- sending the reply message to the first steering controller based on the detecting.

9. The method of claim 8, wherein the transition time is computed using the first fault detector or the second fault detector.

10. The method of claim 1, wherein a lane departure of the autonomous vehicle occurs when the transition time expires.

11. A steering system of an autonomous vehicle, the steering system comprising:
- a steering column;
- a first steering controller configured to control the steering column, the first steering controller comprising a first fault detector configured to monitor and detect a fault in the steering system;
- a second steering controller configured to control the steering column, the second steering controller comprising a second fault detector configured to monitor the steering system and to detect a fault in the steering system, wherein the first and second fault detectors communicate with each other; and
- wherein the first fault detector is configured to send a fault detection signal to the second fault detector based on detecting a fault in the first steering controller,
- wherein, based on receiving a fault detection signal from the first fault detector, the second steering controller is configured to partially control the steering column along with the first steering controller during a transition time, and completely control the steering column after the transition time, and
- wherein the first fault detector determines the transition time, within which control of the steering column is completely transferred from the first steering controller to the second steering controller.

12. The system of claim 11, further comprising:
- an autonomous controller in communication with each of the first and second steering controller,
- wherein the second steering controller sends a message to the autonomous controller to inform the autonomous controller that the second steering controller is in control of the steering column, and
- wherein the autonomous controller brings the autonomous vehicle to a stop based on the message.

13. The system of claim 12, wherein detecting the fault in the first steering controller comprises:
- receiving, at the first steering controller from the autonomous controller, an expected value of torque to be applied on the steering column by the first steering controller;
- determining, by a plurality of sensors, an actual value of torque applied on the steering column by the first steering controller; and
- detecting, by the first fault detector, the fault in the first steering controller based on comparing the expected value to the actual value.

14. The system of claim 13, wherein:
based on determining that the actual value is greater than the expected value, the detected fault is classified as excessive torque.

15. The system of claim 13, wherein:
based on determining that the actual value is lesser than the expected value, the detected fault is classified as insufficient torque.

16. The system of claim 13, wherein:
based on determining that the actual value is different from the expected value over a period of time, the detected fault is classified as erratic torque.

17. The system of claim 11, wherein sending a fault detection signal to the second fault detector comprises:
- sending a message from the first steering controller to the second steering controller, wherein the message indicates the detected fault of the first steering controller; and
- receiving, at the first steering controller, a reply message from the second steering controller that confirms the detected fault of the first steering controller.

18. The system of claim 17, receiving a message from the second steering controller that confirms the detected fault of the first steering controller comprises:
- receiving, at the second steering controller from an autonomous controller of the autonomous vehicle, an expected value of torque to be applied on the steering column;
- determining, by the second fault detector of the second steering controller, the actual value of torque applied on the steering column by the first steering controller;
- detecting, by the second fault detector, the fault in the first steering controller based on comparing the expected value to the actual value;
- receiving a message from the first steering controller that indicates the fault in the first steering controller; and
- sending the reply message to the first steering controller based on the detecting.

19. The system of claim 18, wherein the transition time is computed using the first fault detector or the second fault detector.

20. The system of claim 11, wherein a lane departure of the autonomous vehicle occurs when the transition period expires.

* * * * *